United States Patent

[19]

Hicks

[11] Patent Number: 6,002,468
[45] Date of Patent: Dec. 14, 1999

[54] PHOTOGRAPHIC PRINTER

[76] Inventor: Ray Hicks, 2605 Corunna Rd., Flint, Mich. 48503

[21] Appl. No.: 09/023,003

[22] Filed: Feb. 12, 1998

Related U.S. Application Data

[63] Continuation-in-part of application No. 08/784,340, Jan. 16, 1997, Pat. No. 5,867,255.

[51] Int. Cl.[6] ................................................. G03B 27/72
[52] U.S. Cl. .............................................. 355/71; 355/54
[58] Field of Search .................................. 355/43, 45, 56, 355/64, 68, 71, 77, 54; 396/310

[56] References Cited

U.S. PATENT DOCUMENTS

| | | | |
|---|---|---|---|
| 3,511,565 | 5/1970 | Harman | 355/75 |
| 3,661,449 | 5/1972 | Wright | 355/54 |
| 3,737,227 | 6/1973 | Harter et al. | 355/74 |
| 4,043,660 | 8/1977 | Wingerter | 355/43 |
| 4,150,991 | 4/1979 | Dillow | 355/46 |
| 4,576,471 | 3/1986 | Kogane | 355/50 |
| 4,660,091 | 4/1987 | Nutting | 355/68 |
| 4,737,825 | 4/1988 | Davis | 355/54 |
| 4,908,657 | 3/1990 | Kogane | 355/75 |
| 4,951,086 | 8/1990 | Hicks | 355/41 |
| 5,038,168 | 8/1991 | Kurimoto et al. | 355/71 |
| 5,072,256 | 12/1991 | Hicks | 355/71 |
| 5,097,292 | 3/1992 | Hicks | 355/54 |
| 5,099,275 | 3/1992 | Hicks | 355/55 |
| 5,130,746 | 7/1992 | Hicks | 355/71 |
| 5,146,266 | 9/1992 | Hicks | 355/75 |
| 5,257,066 | 10/1993 | Hicks | 355/75 |
| 5,321,465 | 6/1994 | Hicks | 355/77 |
| 5,343,272 | 8/1994 | Hicks | 355/75 |
| 5,617,184 | 4/1997 | Kuwayama | 355/75 |
| 5,743,609 | 4/1998 | Bauer et al. | 396/310 |

*Primary Examiner*—D. Rutledge
*Attorney, Agent, or Firm*—Young & Basile, P.C.

[57] ABSTRACT

A film drive mechanism for varying the size and configuration of an aperture in a riser block of a photographic printer. The aperture is defined by a plurality of plates positioned in surrounding relation to the aperture and having tongue and groove edges slidably abutting tongue and groove edges of adjacent plates. A stepper motor is provided in association with each plate to individually power the plate in an X or Y direction with the plate being free to move in its unpowered direction. The size and configuration of the aperture is adjusted by individual adjustment of the plates utilizing the individual stepper motors with the individual movement of each plate constituting powered movement in a first direction accompanied by unpowered yielding movement of an adjacent plate against which the powered plate pushes.

12 Claims, 10 Drawing Sheets

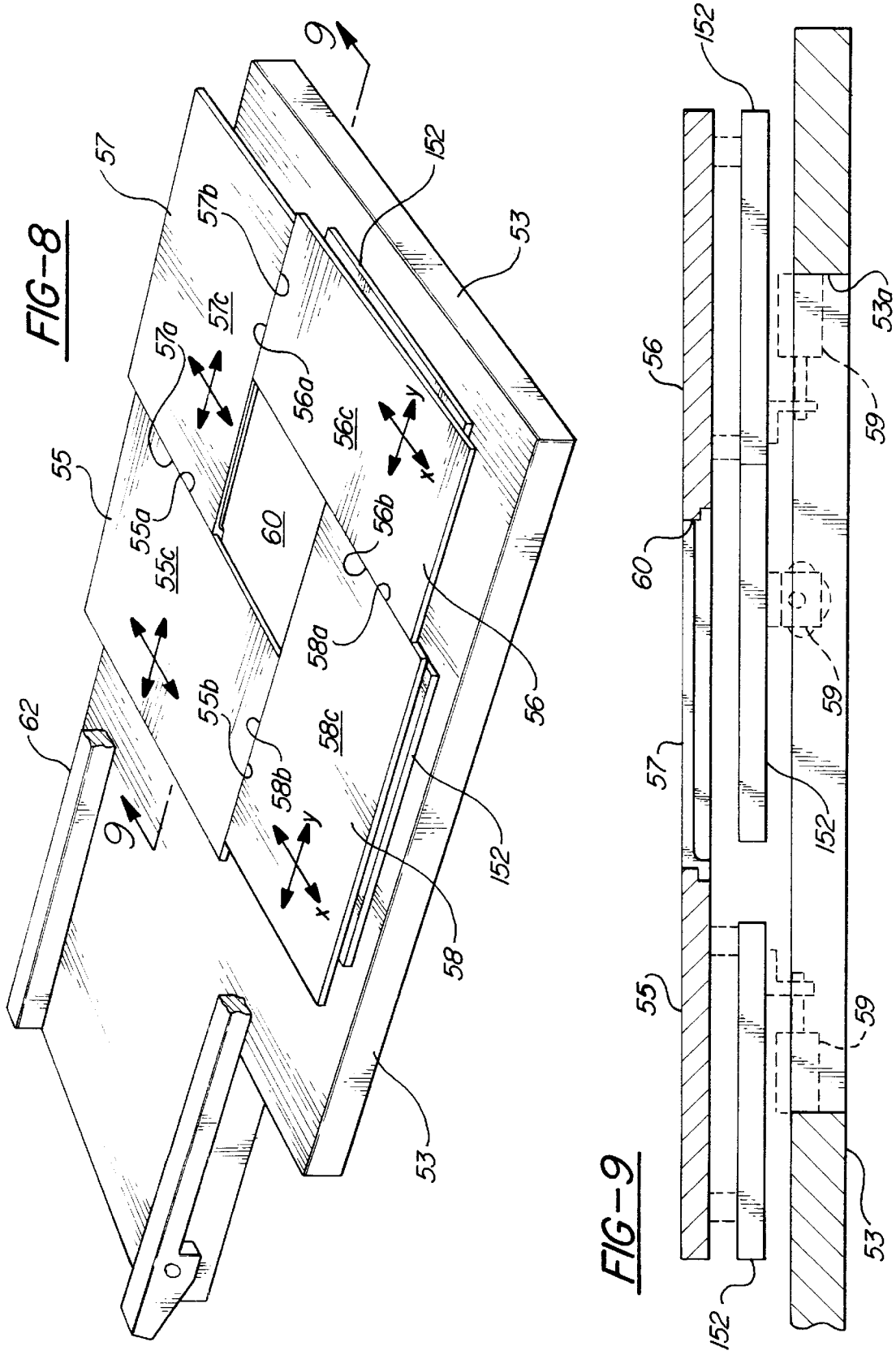

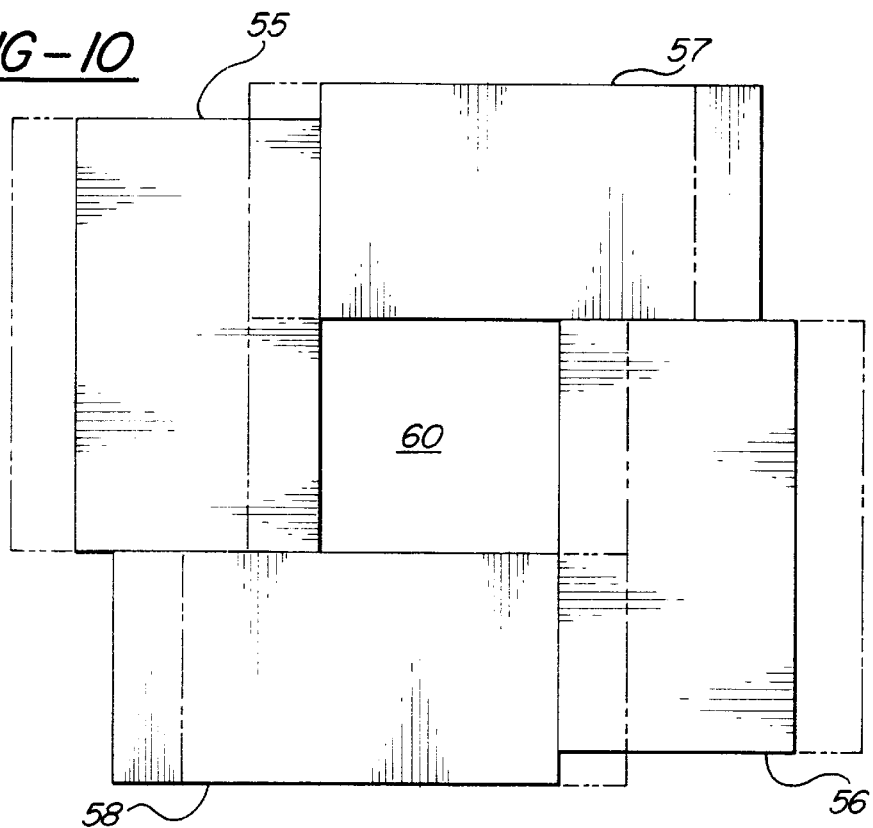
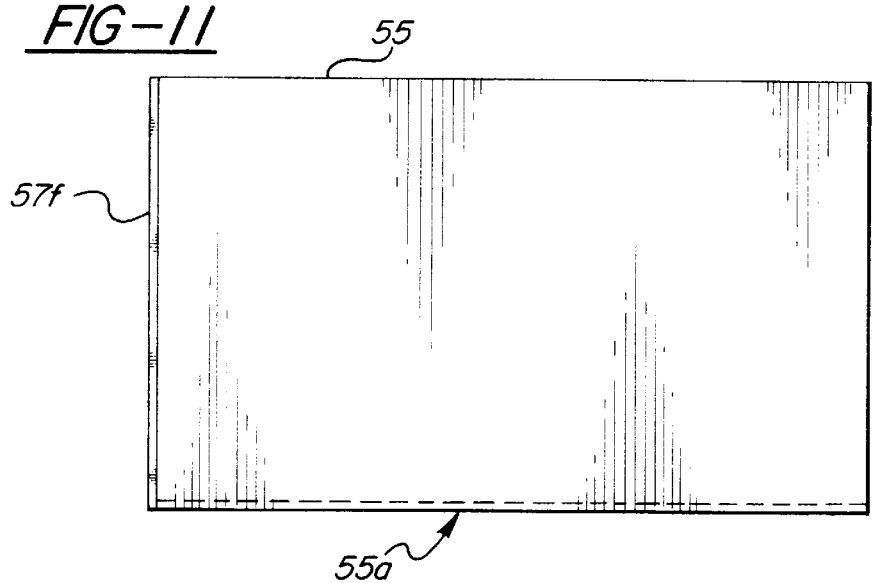
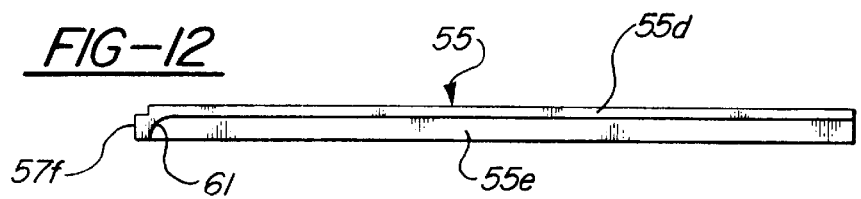

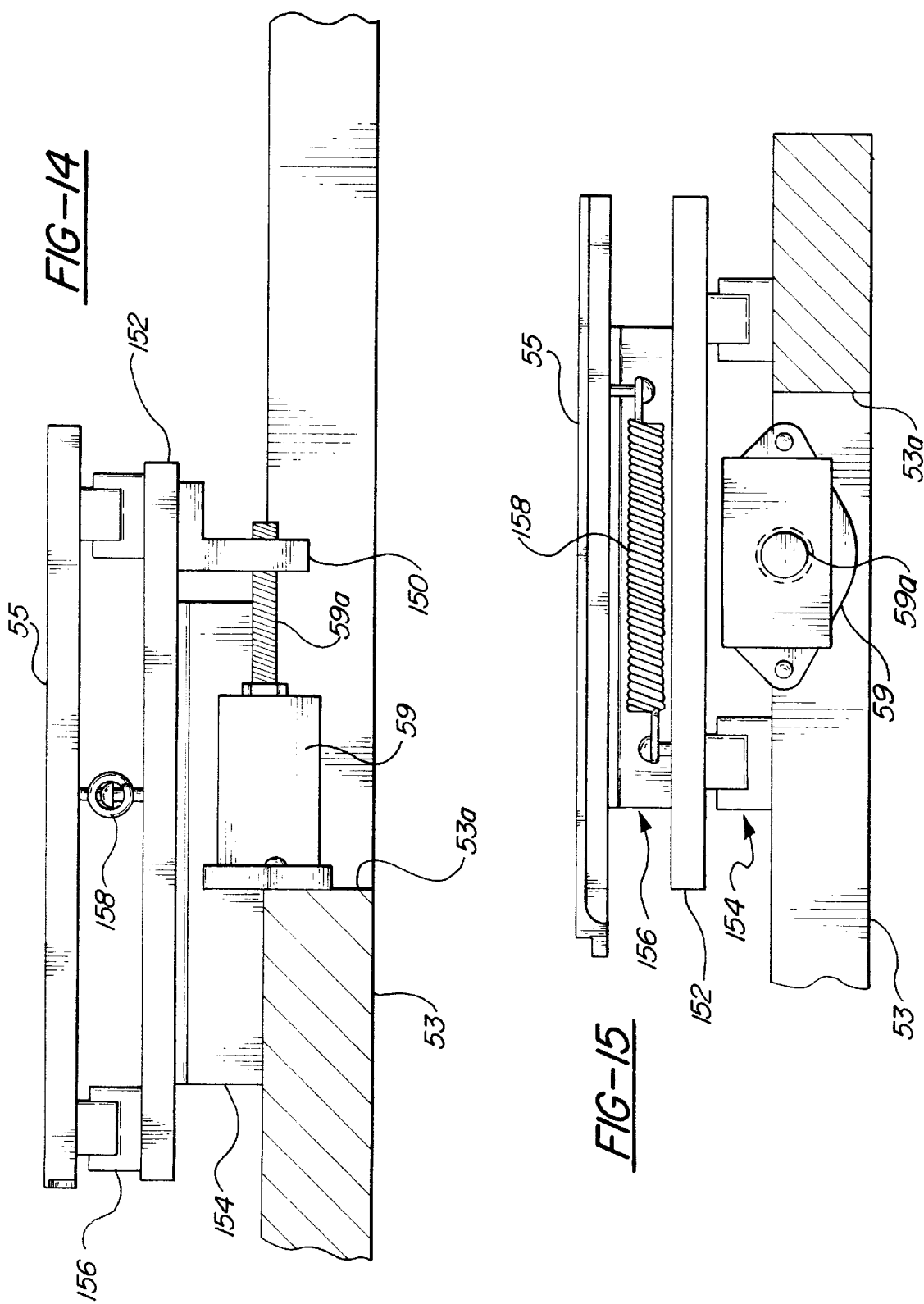

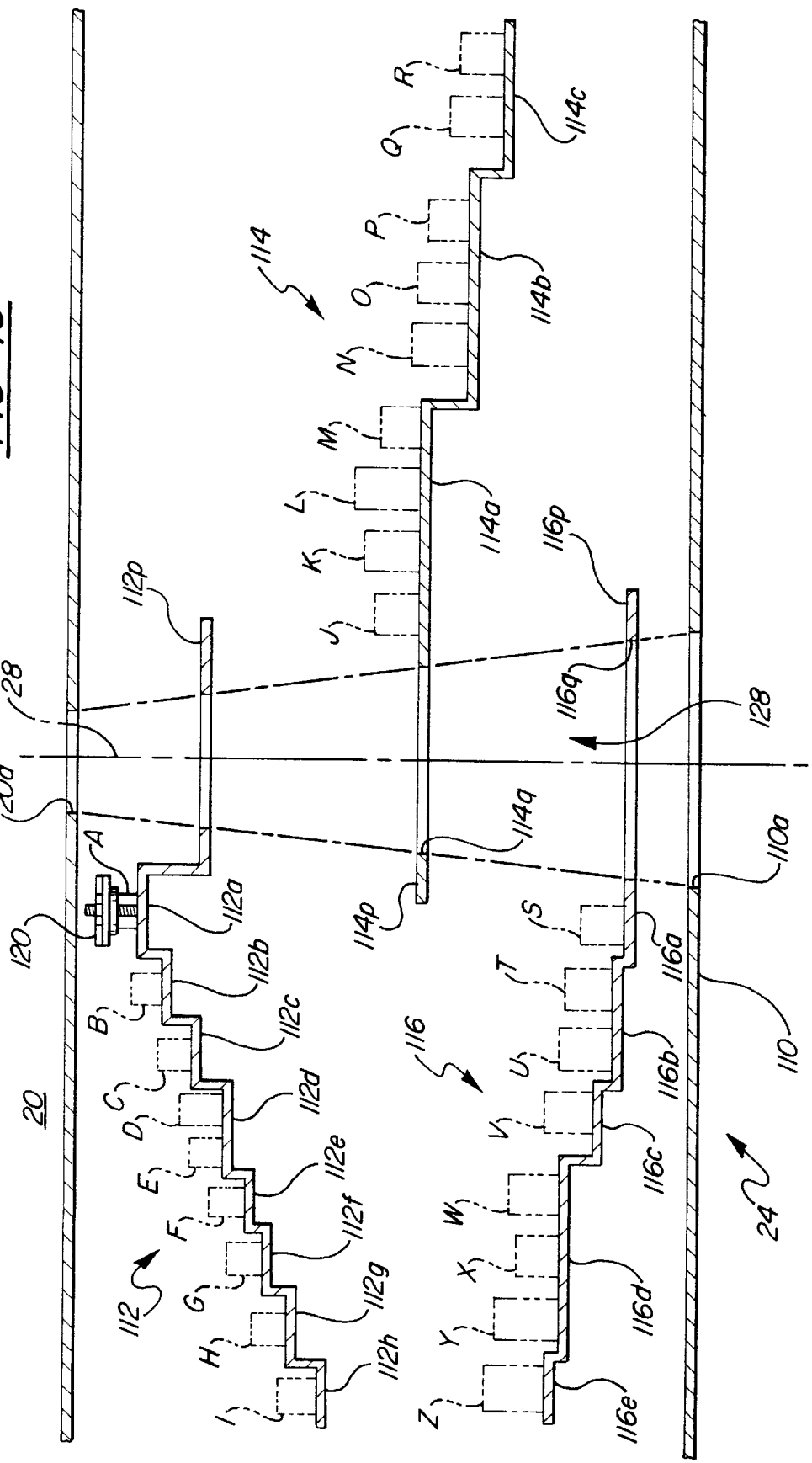

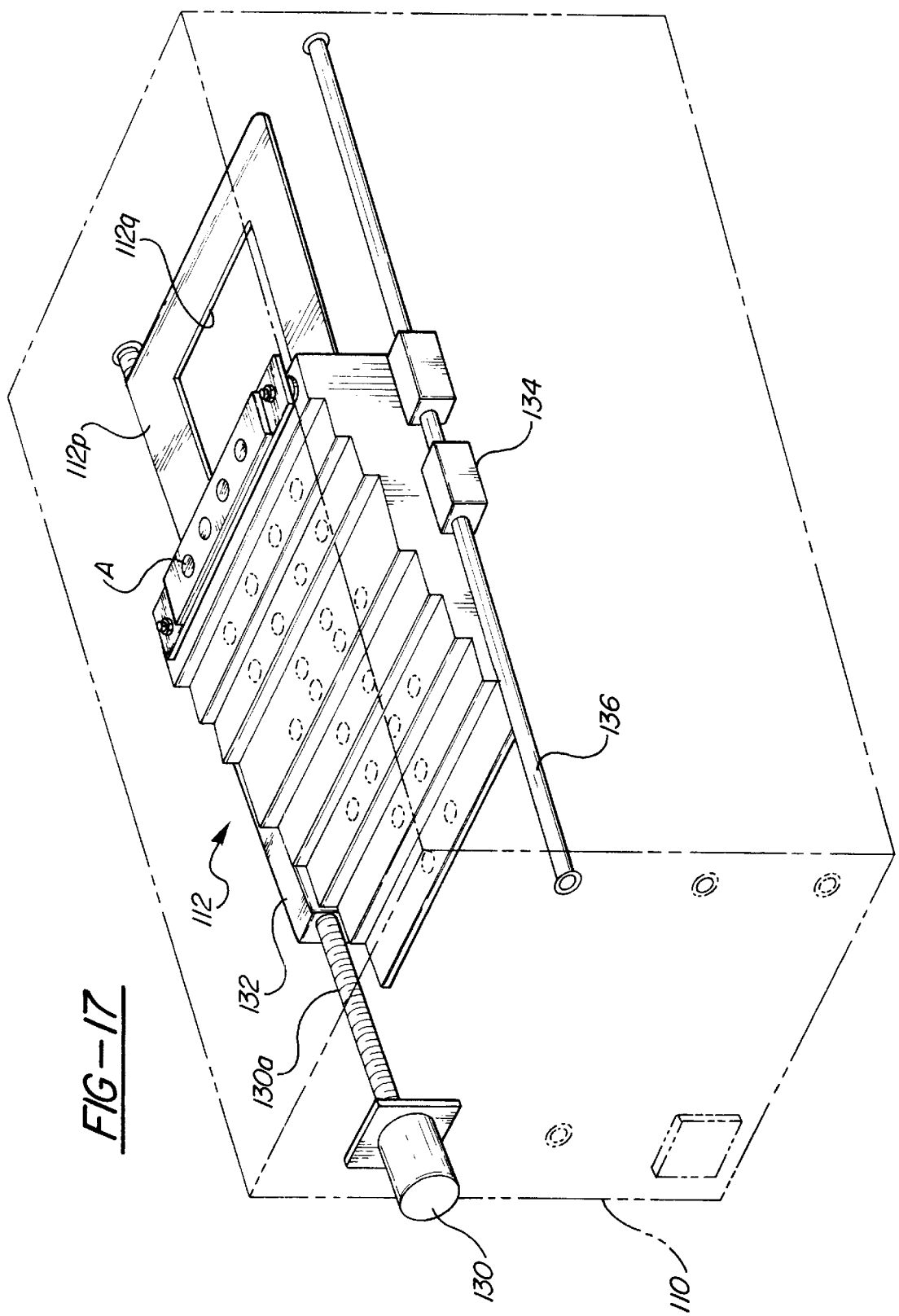

PHOTOGRAPHIC PRINTER

RELATED APPLICATION

This application is a continuation in part of U.S. patent application Ser. No. 08/784,340 filed on Jan. 16, 1997, now U.S. Pat. No. 5,867,255.

BACKGROUND OF THE INVENTION

This invention relates to photographic printers.

Commercial photographic processing laboratories require the capability of making vast numbers of photographic prints from equally large numbers of photographic negatives. The photographic negatives are typically handled in long roll form and are processed in photographic printers by mounting the long roll of negative film on mechanized film drives. The photographic printers may operate in both automated or semi-automated environments.

Most film drives for use with these photographic printers are either electrically or pneumatically powered. A continuous roll of exposed and developed photographic film is mounted on the feed spool of the film drive and routed across the optical stage of the photographic printer. Individual negative frames are sequentially positioned at the optical stage of the photographic printer by operation of the drive components of the film drive so that one or more photographic prints can be made from each frame under either operator or machine control. Finally, the film is collected on a film take-up spool of the film drive.

Because photographic film is manufactured in a variety of different widths, a film drive needs to be capable of variably laterally positioning the film in relation to the photographic printer so that the longitudinal center line of the various widths of photographic film can be positioned to correspond with the optical center of the photographic printer. And because each frame of a roll of photographic film requires individual cropping, a film drive further must be capable of variably positioning each frame of a roll of film of a given width in a longitudinal sense. The film drive also desirably provides the ability to expose the individual film frames in either a landscape format or a portrait format.

Various film drives are available that satisfactorily perform all of the above-described functions. See, for example, the printers disclosed in applicant's U.S. Pat. Nos. 5,343,272, 5,146,266 and 5,097,292.

However, there still exists a need to adjust the film as it is being processed in a manner to compensate for exposures that are unwantedly tilted with respect to horizontal or vertical references; there is a need to provide an improved lens deck assembly for the printer; and there is a need to provide an improved riser block for the printer.

SUMMARY OF THE INVENTION

This invention is directed to the provision of an improved photographic printer.

More specifically, this invention is directed to the provision of a film drive assembly that provides selective positioning of each frame of film relative to the optical stage of the associated printer including positioning in a manner to compensate for unwanted tilting of the exposure.

This invention is further directed to the provision of an improved lens deck assembly for the printer.

This invention is yet further directed to the provision of an improved riser block for the printer.

The invention printer is intended for use with photographic equipment of the type including an optical stage defining an optical center line and includes a base defining a central aperture adapted to be positioned proximate the optical stage, a table assembly mounted on the base for rotary movement about the optical center line and including an aperture, and a film transport mechanism movable with the table assembly and defining a longitudinal film path passing over the table aperture whereby the film transport mechanism may be rotated with the table assembly about the optical center line between portrait and landscape formats.

According to the invention, the printer further includes rotation means mounting the film transport mechanism for rotary movement relative to the table assembly about the optical center line. With this arrangement, the film transport mechanism may be rotated relative to the table assembly aperture to rotate the film relative to the table assembly aperture and compensate for unwanted tilting of the exposure.

According to a further feature of the invention, the rotation means comprises a ring mount member having a central ring portion positioned concentric to the optical center line and parallel rails at opposite sides of the central ring portion, and the film transport mechanism is mounted on the rails for movement in a direction transverse to the longitudinal film path. With this arrangement, adjustment of the film relative to the aperture in an X direction may be achieved by selectively moving the film along the longitudinal film path, adjustment in the Y direction may be achieved by moving the film transport mechanism transversely on the rails, and rotary adjustment of the film relative to the aperture may be achieved by rotary movement of the film transport mechanism about the optical center line.

According to a further feature of the invention, first rotation means mount the ring mount member and the table assembly for joint rotary movement about the optical center line to allow joint movement of the film transport mechanism and the table assembly between portrait and landscape formats, and second rotation means mount the ring mount member for rotary movement relative to the table assembly about the optical center line to allow rotation of the film relative to the table assembly aperture.

According to a further feature of the invention, the first rotation means comprises first bearing means mounting the table assembly for rotary movement on the base and means drivingly interconnecting the table assembly and the ring mount member, the second rotation means comprises second bearing means mounting the ring mount member for rotary movement relative to the table assembly, and the means drivingly interconnecting the table assembly and the ring mount member is operative when actuated to rotate the ring mount member relative to the table assembly. This arrangement facilitates the joint rotary movement of the table assembly and ring mount member between portrait and landscape formats and further facilitates the selective rotary movement of the film relative to the table assembly aperture to correct for out of level exposures.

According to a further feature of the invention, the printer includes means for adjusting the size and configuration of the aperture and the adjusting means comprises a plurality of plates mounted for relative movement to adjustably define the aperture and having co-planar upper faces. This arrangement provides a co-planar upper face for the aperture to minimize light leakage and improve focus.

According to a further feature of the invention, the printer includes a lens deck and the lens deck includes a plurality of lens carriages mounted at respective levels on the optical axis for linear movement in parallel directions generally normal to the optical axis and each including a plurality of laterally spaced lens assemblies. With this arrangement, the carriages may be selectively moved within the lens deck housing to bring a lens or lens set into alignment with the optical axis corresponding to the film size in use and the desired print sizes.

BRIEF DESCRIPTION OF THE DRAWINGS

FIG. 3 is a front view of the film drive assembly;

FIG. 4 is an end view of the film drive assembly;

FIG. 8 is a perspective view of a riser block employed in the printer;

FIG. 9 is a cross-sectional view taken on line 9—9 of FIG. 8;

FIG. 10 is a schematic plan view of the riser block;

FIG. 11 is a plan view of a blade employed in the riser block;

FIG. 12 is an edge view of the blade of FIG. 11;

FIGS. 14 and 15 are detail views showing the mounting and powering of a blade;

FIG. 16 is a somewhat schematic view of a lens deck employed in the printer;

FIG. 17 is a perspective view of a carriage employed in the lens deck; and

Figure 1:
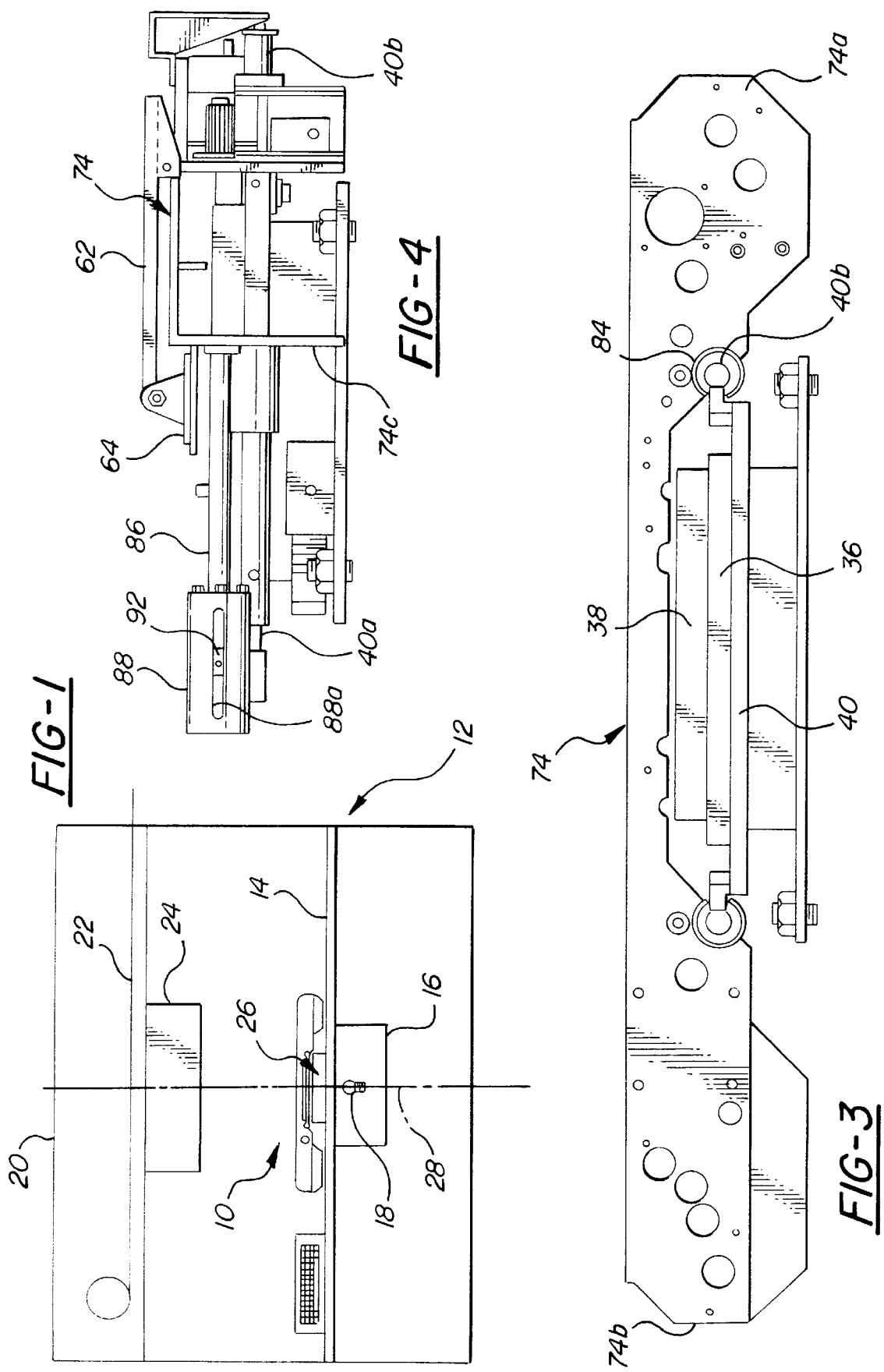
FIG. 1 is schematic view of a photographic printer employing a film drive assembly according to the invention.
Figure 2:
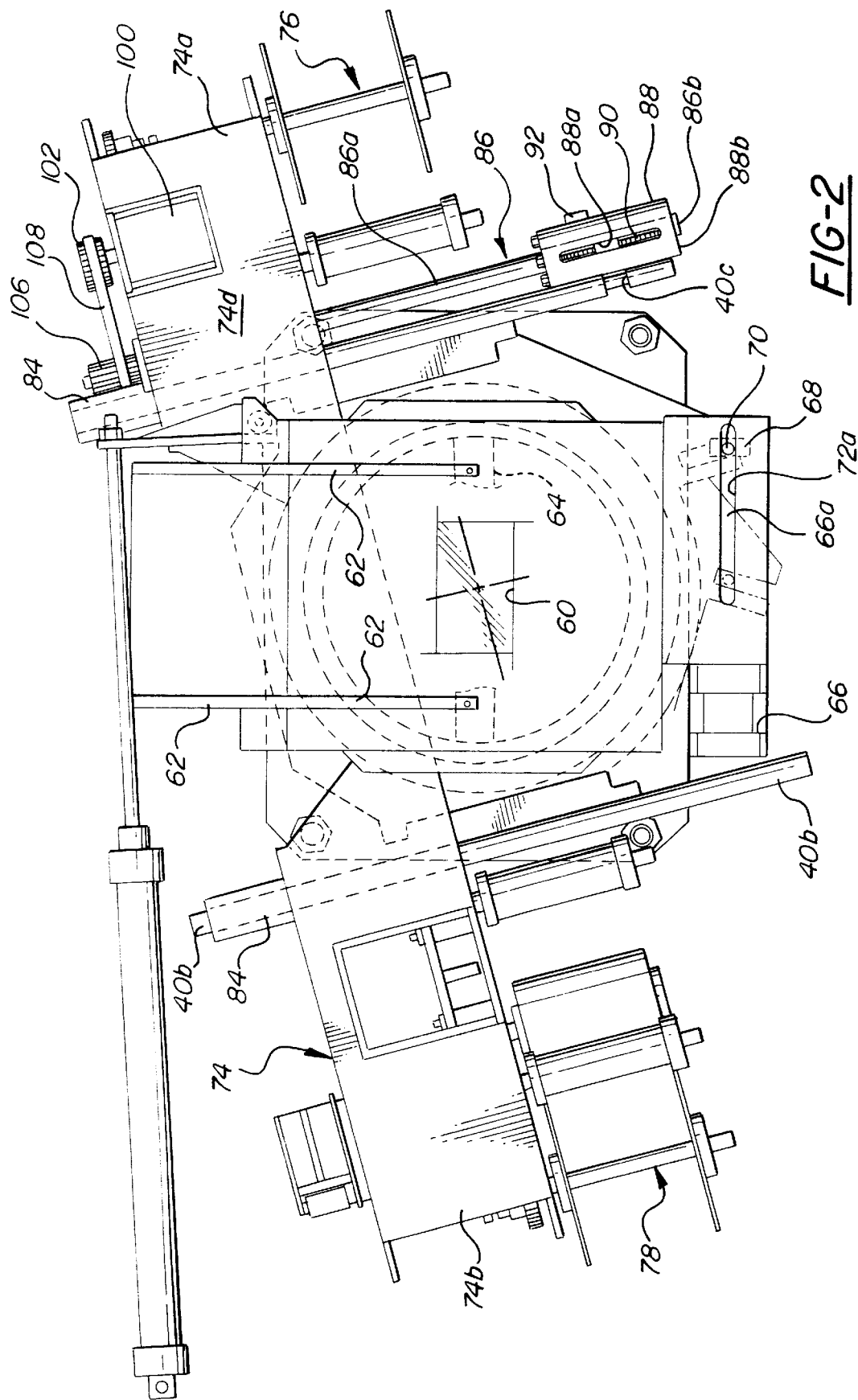
FIG. 2 is a plan view of the film drive assembly.
Figure 5:
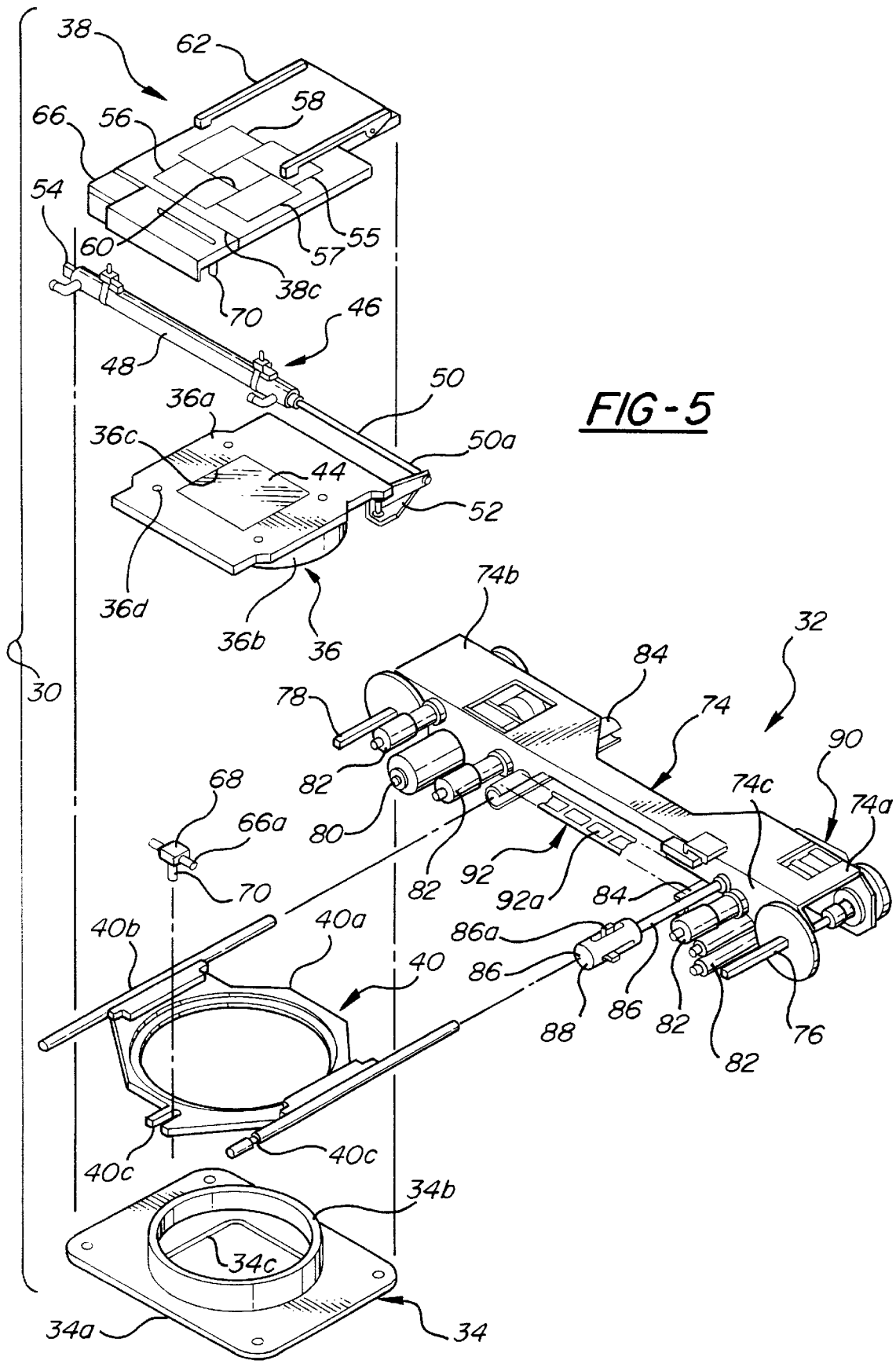
FIG. 5 is an exploded view of the film drive assembly.
Figure 6:
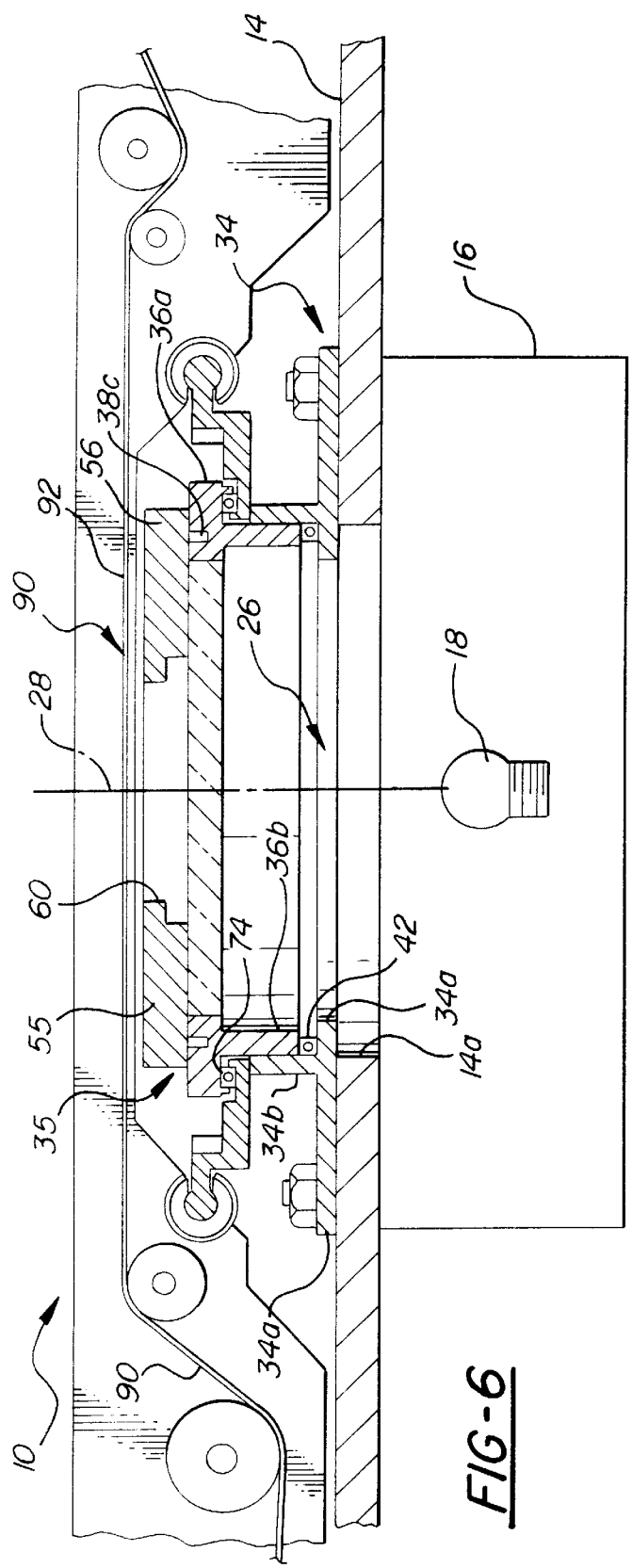
FIG. 6 is a somewhat schematic cross-sectional view of the film drive assembly.

Photographic printer 12 has a desk configuration and includes a work surface or counter 14 supporting a film drive assembly 10, a lamp house 16 positioned beneath the counter and including a light source 18, a paper drive cabinet 20 positioned over the counter and housing a supply of photographic paper 22, and a lens deck assembly 24 positioned beneath cabinet 20 and over film drive assembly 10.

Film drive assembly 10 is positioned on surface 14 at the optical stage 26 of the photographic printer in symmetric relation to the optical center line or axis 28 of the photographic printer.

With reference to FIGS. 2-6, film drive assembly 10, broadly considered, includes a mount base assembly 30 and a film transport mechanism 32.

Mount base assembly 30 includes a base 34, a table assembly 35, and a ring mount member 40.

Base 34 includes a generally planar base portion 34a and a central annular pedestal portion 34b upstanding from plate portion 34a. Base portion 34 is fixedly secured to surface 14 in symmetric relation to center line 28 and defines a central aperture 34c positioned over an aperture 14a in surface 14 so as to allow light from light source 18 to pass upwardly through apertures 14a and 34c.

Table assembly 35 includes a table 36 and a riser block 38.

Table 36 includes a planar main body portion 36a and a downstanding annular ring portion 36b. Ring portion 36b is rotationally received within pedestal portion 34b of the base utilizing bearing means 42. A central aperture 36c is provided in planar portion 34a and a glass or plexiglass light-diffusing member 44 is positioned in aperture 36c. An air cylinder 46 controls rotary movement of table 36 about center line 28 between landscape and portrait positions. Air cylinder 46 includes a cylinder body 48, a piston rod 50, and a bracket 52 interconnecting the free end 50a of the piston rod to table 36. A bracket 54 on cylinder 48 allows the cylinder 46 to be fixedly secured to a suitable location on the photographic printer 12.

Riser block 38 includes a planar base member 53 having a central aperture 53a, four selectively movable identical cropping blades 55, 56, 57 and 58 positioned on base member 53 and defining an aperture 60 in overlying relation to aperture 53a, and a plurality of stepper motors 59 positioned on the base member 53 and operative to selectively and individually move blades 55–58 to selectively vary the size and configuration of aperture 60.

Each blade is mounted for movement on base 53 in both X and Y directions and is powe red for movement in either the X or Y direction by a respective stepper motor 59. For each plate, the stepper motor is positioned beneath the plate in base aperture 53a and includes a lead screw 59a threadably engaging a threaded bore in a bracket 150 fixed to the underface of a mounting plate 152 which is mounted for movement on base 53 in a Y direction by bearing ways 154. The respective plate (55 in FIG. 14) is in turn mounted on the mounting plate 152 by bearing ways 156 mounting the plate 55 for movement on the mounting plate in an X direction.

Plates 55, 56, 57 and 58 are arranged for relative sliding movement to vary the size and configuration of central aperture 60. The sliding interfaces between the plates define a generally tongue and groove configuration.

Specifically, edge 55a of plate 55 defines a tongue (55d) and groove (58e) configuration for mating sliding coaction with a reverse tongue (57d) and groove (57e) configuration defined by edge 57a of plate 57; edge 57b of plate 57 has a tongue (57f) and groove (57g) configuration for mating sliding coaction with a reverse tongue and groove configuration defined by edge 56a of plate 56b; edge 56b of plate 56 has a tongue and groove configuration slidably coacting with a reverse mating tongue and groove configuration on edge 58a of plate 58; and edge 58b of plate 58 has a tongue and groove configuration slidably coacting with a reverse tongue (55f) and (55g) groove configuration in edge 55b of plate 55.

The mating tongue and groove configurations at the sliding interfaces of the plates allows the top surfaces 55c, 55c and 57c and 58c of the plates to lie in a common plane whereby to present a perfectly flat surface for receipt of the underface of a film strip 92 positioned thereover so that all edges of the film strip and all edges of the aperture are in a common plane to provide a uniform depth of focus on all four sides of the aperture to facilitate sharp focusing of the desired image along all four edges. The described tongue and groove arrangement also provides square corners for the aperture 60 with coplanar upper and lower surfaces, in contrast to the corner fillets present in machined apertures and in contrast to the light transmitting overlapping corners present when overlapping plates are used to form the aperture. Light transmission at the corners of the aperture is further diminished by the machining of the tongue and groove edge of the plates whereby the groove (for example 58e or 57g) extending along an edge of the plate terminates in a fillet or a land portion 61 at the corner of the plate.

Plates 55 and 56 may, for example, be powered by their respective stepper motors 59 to move in a Y direction and may be free to move in an X direction under the urging of plated 57 and 58, and plates 57 and 58 may be powered by their respective stepper motors 59 to move in an X direction and may be free to move in a Y direction under urging of the plates 55 and 56. A spring 158 extends between each blade and the underlying mounting plate in a direction parallel to bearing ways 156. Springs 158 yieldably resist movement of the plate in response to powered movement of an adjacent plate, whereby to maintain a firm driving abutment at the interface of the powered plate and the moved plate and whereby to maintain a positive load on the lead screw of the associated stepper motor to preclude slop or lost motion in the plate drive system.

The riser block further includes lever arms 62 pivotally mounted on base member 53 to control a clamp 64 for holding a film frame positioned over aperture 60 in a flat disposition on the flat co-planar surface defined by the cropping plates 55-58. Arm 62 and thereby clamp 64 may be controlled in known manner by air cylinders carried by base member 53. A stepper motor 66 is secured to the front face 53*a* of the base member and includes a screw output shaft 66*a* threadably engaging a nut 68 carrying a pin 70 slidably guiding in a slot 72*a* of a guide plate 72 whereby actuation of stepper motor 66 rotates screw shaft 66*a* to move nut 68 and pin 70 linearly along slot 72*a*. Riser block 38 is positioned on top of table 36*a* and is held in position relative to table 36*a* via pins 38*c* received in corresponding holes 36*d* in table 36.

Ring mount member 40 includes a central ring portion 40*a* and parallel rail portions 40*b* positioned on opposite, diametrically opposed sides of ring portion 40*a*. Ring portion 40*a* is rotationally mounted beneath table main body portion 36*a* in surrounding relation to table ring portion 36*b* utilizing a bearing structure 74. A radially outwardly opening slot 40*c* in ring 40*a* receives the lower end of pin 70 so that the pin functions to move the ring mount member jointly with the table assembly between portrait and landscape formats but linear movement of pin 70 in guide slot 72*a* in response to actuation of stepper motor 66 has the effect of rotating ring mount member 40 relative to riser block 38 about optical center line 28. Initial and moved positions of ring mount member 40 relative to the riser block are shown in solid and dash lines respectively in FIG. 2. It will be seen that pin 70 moves radially in slot 40*c* as the ring mount member rotates relative to riser block 38.

Film transport mechanism 32 includes an elongated frame 74, a supply or feed spool 76 mounted on a feed end 74*a* of the frame, a take-up spool 78 mounted on a delivery end 74*b* of the frame, a suitably powered drive spool 80, guide spools 82, C-tubes 84, a selector shaft 86, a selector or index knob 88, and a vernier adjustment assembly 90. Film transport 32 is mounted on the ring mount member 40 by positioning C-tubes 84 slidably over respective rails 40*b* so that the film transport is free to move laterally or transversely with respect to the ring mount member. Spools 76–82 coact to define a longitudinal film feed path 90 extending from supply spool 76 to take-up spool 78 and passing over riser block aperture 38*a* proximate optical center line 28 so that film 92 from supply spool 76 may be selectively and incrementally moved along path 90 for take-up on spool 78 and individual film frames 92*a* (FIG. 7) may be incrementally and respectively moved into alignment with optical center line 28.

Selector shaft 86 has a circular cross-section and passes slidably through a journal aperture provided in the front wall 70*c* of frame 74 with a portion 86*a* extending in cantilever fashion from the front wall and terminating in a free end 86*b*.

Selector or index knob 88 has a generally circular configuration and is mounted for rotation on the cantilever portion 86*a* of selector shaft 86 proximate the free end 86*b*. Selector knob 88 is provided with four slots 88*a* extending parallel to the axis of shaft 86 and spaced equally circumferentially about the knob. A corresponding plurality of threaded shafts 90 have a slotted end positioned proximate the outboard face 88*b* of the selector knob to allow for manual rotation of the shafts. Tabs 92 are threadably mounted on respective threaded shafts 90 and extend radially outwardly through respective slots 88*a*. The tabs 92 are moved laterally along the central axis of selector shaft 86 by selective rotation of threaded shafts 90 utilizing the slotted shaft ends.

Vernier assembly 90 includes an electric stepper motor 100 mounted in the top wall 74*b* of the frame, a drive pulley 102 driven by a stepper motor output shaft 104, a driven pulley 106, and a drive belt 108 trained around pulleys 102 and 106 so that pulley 106 is rotated in response to energization of stepper motor 100. Pulley 106 includes a threaded internal bore (not shown) threadably receiving a threaded inboard end of selector shaft 86. Further details of selector assembly 86/88 and vernier adjustment assembly 90 are shown in assignee's U.S. Patent No. 5,343,272.

Film transport mechanism 32 will be seen to be mounted on rails 40*b* for sliding movement relative to the ring mount member to selectively laterally position a frame 92*a* of the film 92 relative to aperture 38*a* in riser block 38. Specifically, tabs 92 of selector knob 88 are preset by selective adjustment of the associated shafts 90 to respectively correspond to a plurality of commonly encountered film width sizes such, for example, as 35 mm, 70 mm, etc.

Lens deck assembly 24 includes a housing or cabinet 110 and a plurality of lens carriages 112, 114, 116 positioned in the cabinet 110.

Cabinet 110 is positioned beneath photographic paper drive cabinet 20 in overlying relation to film drive assembly 10 and is centered on optical axis 28.

Lens carriages 112, 114 and 116 (FIG. 16) are mounted in the cabinet for sliding movement in generally horizontal directions generally perpendicular to optical axis 28 and are positioned at different levels in the cabinet. Specifically, lens carriage 112 is mounted at an upper level in the cabinet and has a rest or park position to the left of optical axis 28 as viewed in FIG. 16; lens carriage 11 is mounted at an intermediate level in the cabinet below carriage 112 and has a rest or park position to the right of optical axis 28; and lens carriage 116 is mounted at a lower level in the cabinet below carriage 114 and has a rest or park position to the left of optical axis 28.

Each carriage 112, 114, 116 has a stepped configuration defining a plurality of successively and incrementally increasing or decreasing levels. Specifically, carriage 112 defines successively lower levels 112*a*, 112*b*, 112*c*, 112*d*, 112*e*, 112*f*, 112*g* and 112*h*; carriage 114 defines successively lower levels 114*a*, 114*b* and 114*c;* and carriage 116 defines successively higher levels 116*a*, 116*b*, 116c, 116*d* and 116*e*.

A lens or lens set is positioned on each level of each carriage. Each lens or lens set corresponds to a film size and to a desired print size. Specifically, four lenses A corresponding to wallet sized 6 mm×6 mm film may be positioned on level 112*a*; four lenses B corresponding to wallet sized 6 mm by 4.5 mm film may be positioned on level 112*b*;

Four lenses C corresponding to wallet sized 46 mm film may be positioned on level 112c; two lenses D corresponding to 3.5×5 prints of 6 mm×4.6 mm film may be positioned on level 112d; four lenses E corresponding to wallet sized non-perforated 35 mm film may also be positioned on level 112d; two lenses F corresponding to 3.5×5 prints of 6 mm×4.5 mm film may be positioned on level 112e; four lenses G corresponding to wallet sized prints of perforated 35 mm film may be positioned on level 112f; two lenses H corresponding to 3.5×5 prints of 46 mm film may be positioned on level 112g; two lenses I corresponding to 5×7 prints of 6 mm×6 mm film may be positioned on level 112h; two lenses J corresponding to 3.5×5 prints of 35 mm perforated film may be positioned on level 114a; two lenses K corresponding to 5×7 prints of 6 mm×4.5 mm film may be positioned on level 114a outboard of lenses J; two lenses L corresponding to 3.5×5 prints of non-perforated 35 mm film may be positioned on level 114a inboard of lenses K; two lenses M corresponding to 5×7 prints of 46 mm film may be positioned on level 114a outboard of lenses L; two lenses N corresponding to 4×5 prints of 35 mm perforated film may be positioned on lens level 114b; one lens o corresponding to an 8×10 print of 6 mm×6 mm film may be positioned on level 114b outboard of lenses N; two lenses P corresponding to a 5×7 print of 35 mm non-perforated film may be positioned on lens level 114b outboard of lenses o; one lens Q corresponding to an 8×10 print of 6 mm×4.5 mm film may be positioned on lens level 114c; two lenses R corresponding to 5×7 prints of 35 mm perforated film may be positioned on lens level 114c outboard of lenses Q; one lens S corresponding to either an 11×14 or a 10×13 print of 35 mm perforated film may be positioned on lens level 116a; one lens T corresponding to an 8×10 print of 35 mm perforated film may be positioned on lens level 116b; one lens U corresponding to either an 11×14 or a 10×13 print of 35 mm non-perforated film may be positioned on lens level 116b outboard of lens T; one lens V corresponding to either an 11×14 or a 10×13 print of 46 mm film may be positioned on lens level 116c; one lens W corresponding to an 8×10 print of 35 mm non-perforated film may be positioned on lens level 116d; one lens X corresponding to either and 11×14 or a 10×13 print of 6 mm×4.5 mm film may be positioned on lens level 116d outboard of lenses W; one lens Y corresponding to either an 11×14 or a 10×13 print of 6 mm×6 mm film may be positioned on lens level 116d outboard of lenses X; and one lens Z corresponding to an 8×10 print of 46 mm film may be positioned on lens level 11e.

Figure 18:
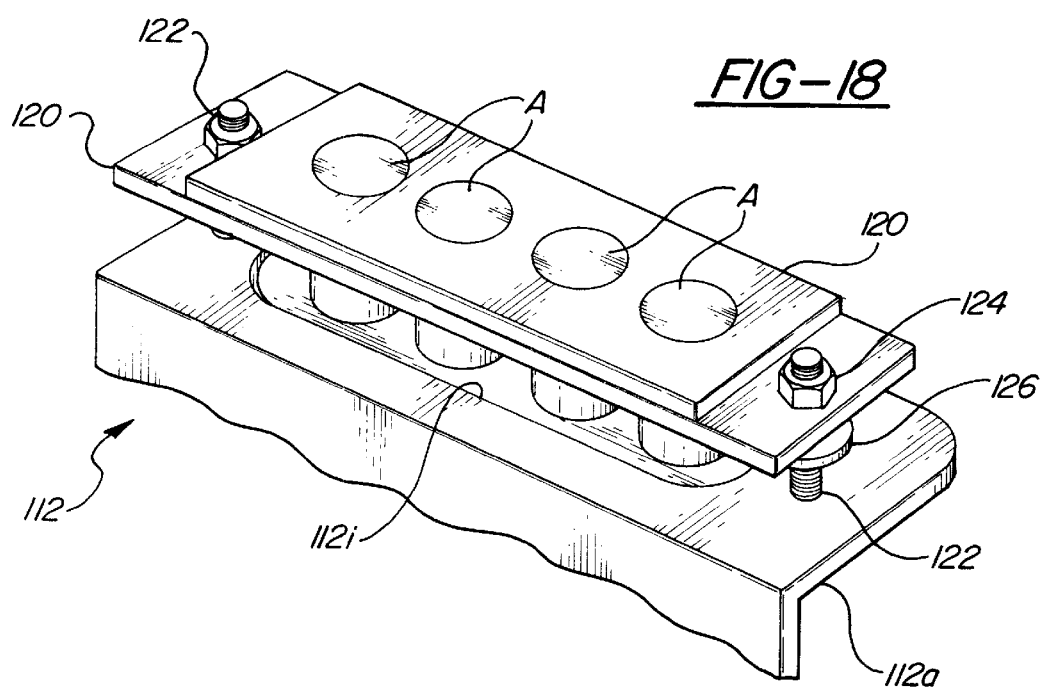
FIG. 18 is a detail view of a portion of the carriage of FIG. 17. Detailed Description of the Preferred Embodiment The photographic printer of the invention is generally seen in FIG. 1 at 12.

Each lens or set of lenses is mounted on the respective carriage level by the lens mounting structure best seen in FIG. 18 which illustrates the mounting of the four lenses A on the level 112a of carriage 112.

Specifically, each lens or lens set is mounted on a lens board 120 and the lens board is mounted on a pair of threaded studs 122 upstanding from opposite sides of the respective level. The lenses A are positioned at their upper ends in board 120 and are positioned at their lower ends in an opening 112i in the level 112a of carriage 112. The precise height of the board 120 above level 112a, and thereby the precise level of lenses A relative to the optical axis 28, is adjusted by selective manipulation of a nut 124 and a knurled knob 126 associated with each stud. It will be understood that an adjustable lens board assembly as seen in FIG. 18 is provided in association with each lens or lens set so that the height of each lens or lens set may be individually adjusted relative to the optical axis and it will be seen that different lens sets positioned on the same level of the same carriage may be arranged at varying increasing or decreasing heights relative to the optical axis.

It will be understood that, in the operation of the printer, the desired lens set providing the exposure magnification corresponding to the film size being processed and the print sizes desired, is moved into alignment with optical axis 28 by selective sliding movement of the appropriate carriage in the lens deck housing. In this regard, lenses on carriages 112 and 116 are selected in response to rightward movement of the carriages from their parked positions of FIG. 16 and lenses on carriage 114 are selected in response to leftward movement of the carriage from its parked position of FIG. 16.

Each carriage further includes an inboard baffle portion 112p, 114p, 116p, respectively defining rectangular baffle apertures 112q, 114q and 116q. Aperture 116q is larger than aperture 114q and aperture 114q is larger than aperture 112q so that the apertures, when all of the carriages are parked, define a pyramidal light column 128 which is further defined by a relatively large aperture 110a in the base of the lens deck cabinet centered on optical axis 28 and a relatively small aperture 20a in the lower face of the paper cabinet centered on optical axis 28.

When a lens is selected from carriage 112, baffle apertures 114q and 116q coact to form a natural baffling system to eliminate reflection problems caused by stray light that does not follow the intended optical path but rather reflects onto adjacent surfaces and onto the photographic paper. A similar baffling action is provided by baffle apertures 116q and 112q when a lens set on carriage 114 is in use and by baffle apertures 112q and 114q when a lens set on carriage 116 is in use.

The mounting and movement of the carriages in the lens cabinet is seen in FIG. 17 where carriage 112 is illustrated in a position in which it has been moved to the right to position one of the lens sets in alignment with optical axis 28. As seen, movement of the carriage in the lens deck cabinet is achieved by a stepper motor 130 mounted on the cabinet and including a lead screw 130a threadably coacting with a nut structure 132 carried by the carriage to move the carriage fore and aft within the cabinet with the carriage movement guided by bearing blocks 134 on the carriage guiding on a guide rod 13b. Carriages 114 and 116 (not shown in FIG. 17) are similarly mounted, similarly moved, and similarly guided.

When processing a roll of film corresponding to a given film width, the operator simply moves the film drive assembly laterally on rails 40b to a position corresponding to the particular film width being processed and then rotates the selector knob 88 to position the tab 92 corresponding to the specific film width being processed in the detent 40c of the adjacent rail 40b to lock the film drive assembly relative to the mount base assembly. This gross adjustment of the film drive assembly relative to the mount base assembly prepares the mechanism for processing the roll of film having the width corresponding to the setting of the coacting interengaging tab 92 and detent 40c.

As each frame 92a of the film is positioned over the aperture 60 of the riser block, stepper motor 100 is selectively energized to provide a fine, lateral adjustment of the film relative to the aperture 60 corresponding to the specific cropping desired for that frame. The energization of the motor 100 and thereby the fine adjustment of the lateral position of the film drive assembly for each frame may be accomplished by a control panel under the control of the operator or may be accomplished by utilizing information stored in a database for each frame. Each frame of film may thus be selectively positioned relative to the aperture and relative to the optical center line along the Y axis, that is, the axis transverse to the path of movement of the film. Information stored in the database for each frame may also be utilized to selectively position each frame in the X direction relative to the aperture in the riser block, that is, the direction in which the film is moving; further stored information for each frame may be utilized to selectively actuate stepper motors 59 to selectively and individually adjust blades 55–58 and thereby selectively adjust the cropping for each frame; further stored information for each frame may be utilized to move the table assembly and film drive jointly between portrait and landscape formats; and further stored information for each frame may be utilized to selectively actuate stepper motors 130 to selectively move carriages 112, 114, and 116 to selectively bring the lens set corresponding to the film size in use and the desired print sizes into alignment with the optical axis.

Also, according to the invention, further information may be stored in the database for each frame with respect to any undesired tilting of the exposure of the frame caused, for example, by a camera that is not held in a level position at the time that the exposure is made. This tilt database information may be utilized according to the invention to selectively energize stepper motor 66 to selectively move pin 70 along slot 72a to selectively rotate the ring mount member and thereby the film transport mechanism relative to the riser block about the optical center line 28 (for example as between the solid line position of FIG. 2 and the dash line position of FIG. 2) to move the frame of film rotationally relative to the riser block aperture to correct for undesired tilting of the exposure of the frame.

Figure 7:
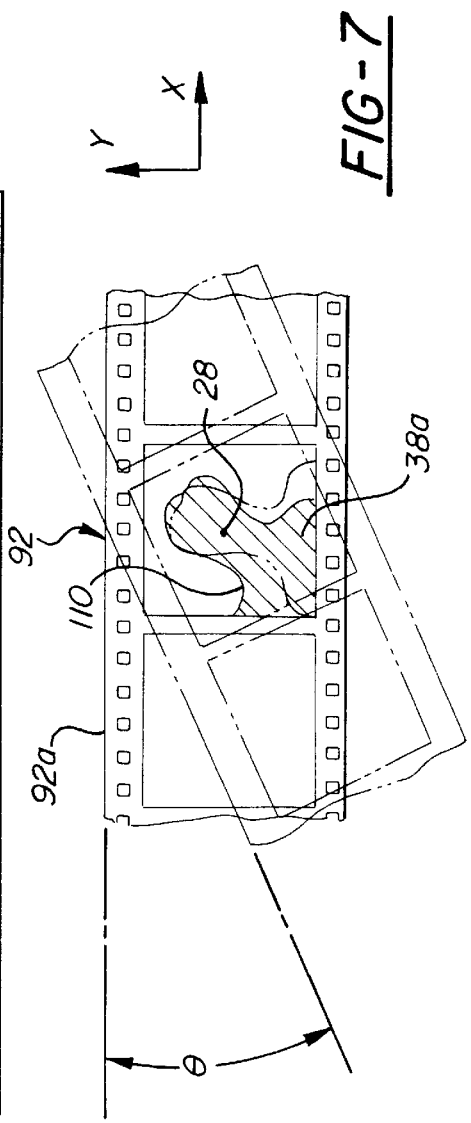
FIG. 7 is a schematic view showing film movements achieved utilizing the invention film drive assembly.
Figure 13:
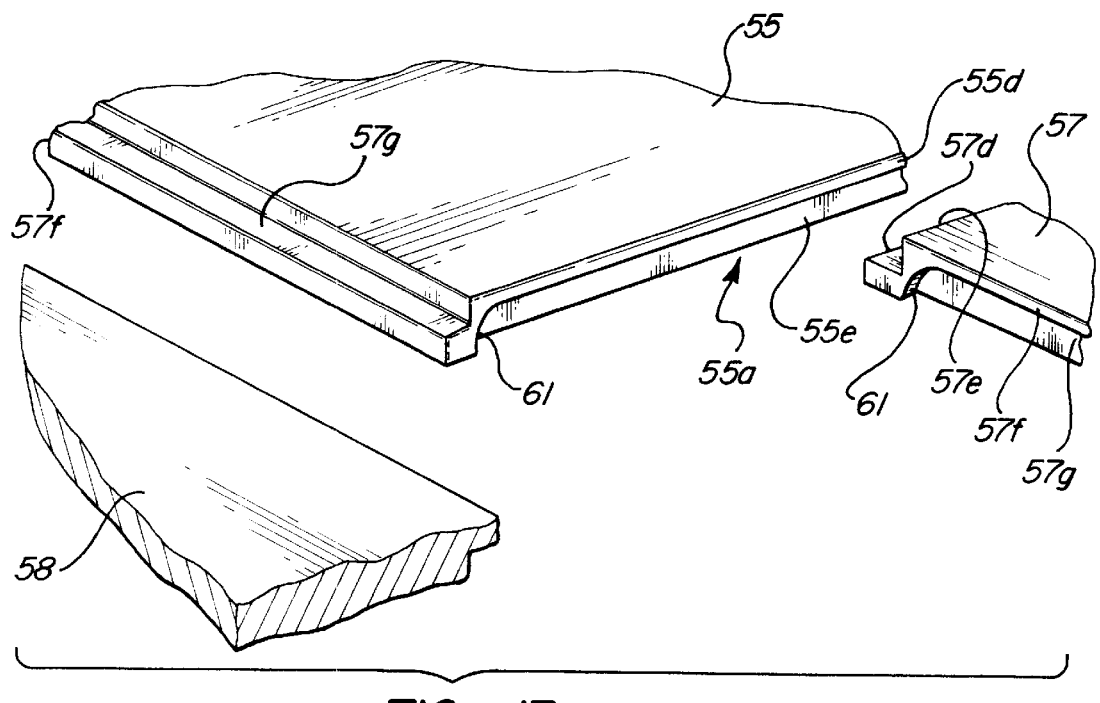
FIG. 13 is a fragmentary exploded view of coacting blades employed in the riser block.

This rotational movement of the frame 92a relative to the riser block aperture 60 is best seen in FIG. 7 wherein an initial tilted disposition of an image 110 in a frame 92a relative to riser block aperture 60 resulting from the camera not being level is shown in solid lines and the corrected or level disposition of the image relative to the riser block aperture 60 resulting from selective rotational movement of the ring mount member through an angle e is seen in dash lines.

The invention will be seen to provide a photographic printer which allows for automated production of photographs without operator intervention. Specifically, the invention provides automated X and Y adjustment of each frame relative to the riser block aperture; automated rotation of the frame relative to the riser block aperture to correct for tilted images; automated selection of the size and configuration of the riser block aperture; and automated selection of the lens to accomplish the exposure magnification selection corresponding to the film in use and the desired print size.

Whereas a preferred embodiment of the invention has been illustrated and described in detail, it will be apparent that various changes may be made in the disclosed embodiment without departing from the scope or spirit of the invention.

I claim:

1. A printer including an optical stage defining an optical center line, a base adapted to be positioned proximate the optical stage, a table assembly mounted on the base and including an aperture and adjustment means for varying the size and configuration of the aperture, and a film transport mechanism mounted on the table assembly and defining a longitudinal film path passing over the table aperture, characterized in that:

the adjustment means comprises a plurality of plates mounted for relative movement to adjustably define the aperture and having co-planar upper faces.

2. A printer drive assembly according to claim 1 wherein:
the plates have edges defining sliding interfaces and the interfaces define a tongue and groove configuration.

3. A printer drive assembly according to claim 2 wherein:
there are four plates and each plate is mounted for movement in both X and Y directions.

4. A printer drive assembly according to claim 3 wherein a power means is associated with each plate and each plate is mounted for powered movement in one of X and Y directions and for unpowered movement in the other X and Y direction.

5. A printer drive assembly according to claim 4 wherein each plate includes spring means resisting movement in the unpowered direction whereby to resiliently resist powered movement of an adjacent blade.

6. A printer drive assembly according to claim 3 wherein:
each plate includes a first edge and a second edge at right angles to the first edge and a first edge of each plate is in abutting engagement with a second edge of another plate.

7. A printer drive assembly according to claim 2 wherein:
each plate includes a first edge defining a tongue and second edge, forming a right angle corner with the first edge, defining a groove for sliding receipt of a tongue on a first edge of an adjacent plate and;
the tongue extends fully to the corner and forms a fillet blocking the end of the groove proximate the corner.

8. A photographic printer including:
an optical stage defining an optical center line axis and an aperture centered on the optical axis;
a film transport mechanism defining a longitudinal film path passing over the aperture;
a plurality of plates positioned in surrounding relation to the aperture to define the aperture and including abutting slidably engaging edges; and
means operative to selectively slide edges of the plates along abutting edges of adjacent plates to vary the size and configuration of the aperture.

9. A printer drive assembly according to claim 8 wherein the upper faces of the plates are co-planar to define a flat plane in surrounding relation to the aperture over which the film may pass.

10. A printer drive assembly according to claim 9 wherein:
the operative means comprises a power device associated with each plate; and
each plate is mounted for powered movement in one of X and Y directions and for unpowered movement in the other X and Y direction.

11. A printer drive assembly according to claim 10 wherein:
each plate includes spring means resiliently resisting movement in the unpowered direction whereby to resiliently resist powered movement of an adjacent plate.

12. A printer drive assembly according to claim 11 wherein the power devices comprise stepper motors with a stepper motor associated with and driving each plate.

\* \* \* \* \*

UNITED STATES PATENT AND TRADEMARK OFFICE
CERTIFICATE OF CORRECTION

PATENT NO : 6,002,468
DATED : December 14, 1999
INVENTOR(S) : Hicks

It is certified that error appears in the above-identified patent and that said Letters Patent is hereby corrected as shown below:

Column 4, line 21, delete "powe red" and insert - -powered- -;

Column 4, line 51, delete "55c" and insert - -56c- -;

Column 4, line 66, delete "58e" and insert - -55e- -;

Column 7, line 3, delete "4.6" and insert - -4.5- -;

Column 7, line 21, delete "o" and insert - - O - -;

Column 7, line 25, delete "o" and insert - - O- -;

Column 7, line 45, delete "11e" and insert - - 116e - -;

Column 9, line 40, delete "e" and insert - -⊖- -.

Signed and Sealed this

Twelfth Day of September, 2000

Attest:

Q. TODD DICKINSON

*Attesting Officer*     *Director of Patents and Trademarks*